Aug. 13, 1940.  E. B. PUNNETT  2,211,160
PROCESS OF RECOVERING MALEIC ANHYDRIDE
Filed Feb. 5, 1937
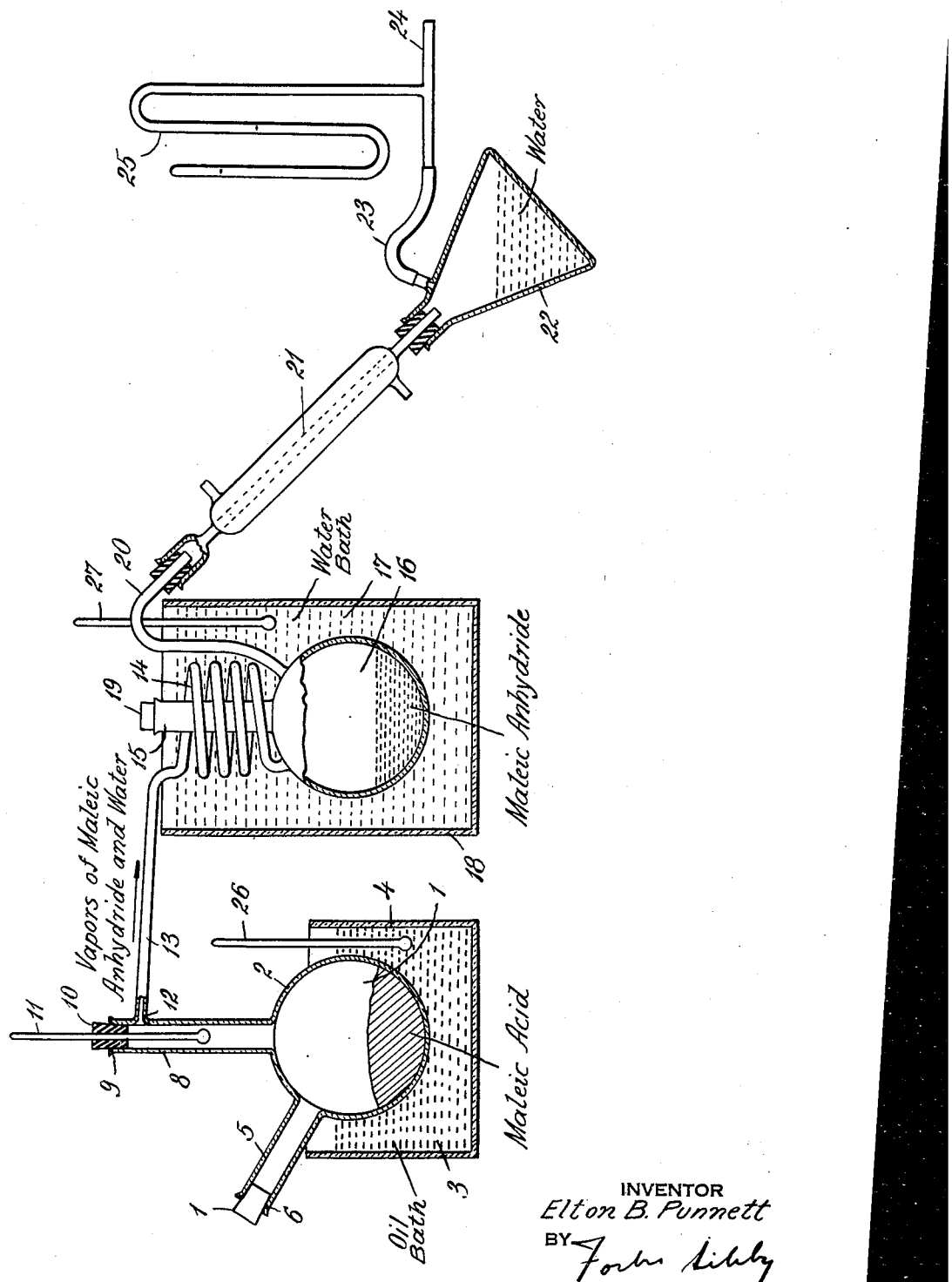
INVENTOR
Elton B. Punnett
BY
ATTORNEY Patented Aug. 13, 1940

2,211,160

UNITED STATES PATENT OFFICE 2,211,160

PROCESS OF RECOVERING MALEIC ANHYDRIDE

Elton B. Punnett, Buffalo, N. Y., assignor to National Aniline & Chemical Company, Inc., New York, N. Y., a corporation of New York Application February 5, 1937, Serial No. 124,201

8 Claims. (Cl. 260—343)

This invention relates to the manufacture of maleic anhydride (the anhydride of maleic acid); more particularly it relates to a process for the recovery of maleic anhydride from a vapor mixture containing maleic anhydride vapor and water vapor.

Maleic anhydride is a well-known organic chemical substance which, at atmospheric pressure, has a setting-point of about 52.5 to 53° C. and a boiling point of about 200° C. According to Beilstein, vol. XVII (fourth edition), page 433, maleic anhydride is converted extremely rapidly by water to maleic acid, and Weiss and Downs in Jour. Am. Chem. Soc., vol. 45 (1923) at page 1005 have shown that maleic anhydride will absorb water vapor from the atmosphere over 71.5% sulfuric acid in a desiccator at temperatures of 50° C. (below the melting point of maleic anhydride) and 70° C. and 90° C. (above the melting point of maleic anhydride) to form maleic acid.

It has been heretofore proposed to produce maleic anhydride from maleic acid by subjecting maleic acid to thermal decomposition. Owing to the affinity of maleic anhydride for water, even at elevated temperatures, the production of maleic anhydride from maleic acid has been heretofore carried out in such a manner as to separate the maleic anhydride, resulting from the thermal decomposition of the maleic acid, at temperatures at which maleic acid tends to decompose into maleic anhydride and water (e. g., above 110° C.) with the thought of preventing recombination of the maleic anhydride and the water vapor. Thus, it has heretofore been proposed to heat maleic acid at temperatures of about 130° C. or above, either alone or in conjunction with chemical dehydrating agents or with water-immiscible liquids, to remove the water by physical or chemical means; and to recover the resulting water-free maleic anhydride, as by distillation. Such processes are objectionable in that the use of chemical dehydrating agents and water-immiscible liquids increases the amount of material required to be handled, and their cost adds to the cost of operation. Further, they require the added step of separately recovering the resulting maleic anhydride.

An object of the present invention is to provide a novel and effective method of recovering maleic anhydride as such from a vapor mixture containing maleic anhydride vapor and water vapor.

Another object of the invention is to provide an improved method of preparing maleic anhydride from maleic acid by thermal decomposition of maleic acid in the absence of dehydrating agents and/or water-immiscible organic solvents.

Other objects of the invention will in part be obvious and will in part appear hereinafter.

I have discovered that maleic anhydride can be efficiently recovered as such in a simple manner from vapor mixtures containing maleic anhydride vapor and water vapor, and especially from the mixture of vapors resulting from the thermal decomposition of maleic acid to maleic anhydride and water vapor, by subjecting the vapor mixture to correlated conditions of temperature and sub-atmospheric pressure within controlled limits, whereby the maleic anhydride is condensed without substantial condensation of water vapor, and separating the maleic anhydride condensate from the remaining vapors at a temperature at which the rate of hydration of maleic anhydride by water vapor is relatively low.

The invention accordingly comprises the steps and the relation of one or more of such steps with respect to others thereof which are exemplified in the following detailed disclosure taken in connection with the accompanying drawing. The scope of the invention will be indicated in the claims.

The invention will be described with reference to a preferred method of procedure for the recovery of maleic anhydride from the vapor mixture produced by the thermal decomposition of maleic acid. It will be understood, however, that the invention is not limited thereto and may be applied to similar mixtures of maleic anhydride vapor and water vapor whether resulting from the thermal decomposition of maleic acid or from other sources. Temperatures are in degrees centigrade and pressures are absolute pressures expressed in mm. of mercury.

In accordance with the preferred method of procedure, a charge of maleic acid is heated in a suitable still by indirect heat exchange with a heating medium which is at a temperature above the melting point of maleic acid, whereby the acid is decomposed to form a mixture of vapors of maleic anhydride and water. The pressure within the still is preferably maintained below atmospheric pressure to insure that the vapors evolved in the still are removed substantially as rapidly as formed. The vapor mixture is withdrawn and cooled to a temperature within the range about 60° to about 80°, and especially about 60° to about 75°, while maintaining the pressure within the range about 70 mm. to about 250 mm., and especially about 100 mm. to about 250 mm., whereby maleic anhydride condenses but practically none of the water vapor. To prevent substantial recombination of the maleic anhydride with the water vapor, the maleic anhydride condensate is removed, preferably promptly, from the remaining vapors at a temperature of about 60° to about 80° to a receiver other than that containing the distilland where it is collected. For convenience in the practice of the invention, the distillation and the condensation steps are carried out under substantially the same subatmospheric pressures.

I have found, by subjecting a mixture of maleic anhydride and water vapors obtainable from maleic acid by thermolysis to a condensing treatment under conditions of temperature and pressure which are adjusted within the limits herein defined, and removing the resulting liquid maleic anhydride condensate from the remaining vapors at a temperature within said range, I can recover unexpectedly high yields of condensed maleic anhydride characterized by unexpectedly low content of maleic acid. Further, I have found this result can be obtained with vapor mixtures resulting from the thermolysis of aqueous slurries and solutions of maleic acid as well as from solid maleic acid. For example, vapor mixtures resulting from the thermolytic decomposition of maleic acid crystals when treated by this process resulted in maleic anhydride condensates equivalent in amount to about 93 per cent to about 97 per cent of the maleic acid decomposed and containing from about 2 per cent to about 7 per cent of maleic acid; and a vapor mixture resulting from the vaporization and thermolytic decomposition of an aqueous solution of maleic acid containing about 60 per cent of maleic acid resulted in a maleic anhydride condensate equivalent in amount to about 60 per cent of the maleic acid decomposed and containing from about 7 per cent to about 10 per cent of maleic acid.

Since accurate control of the condensation temperature is desirable to assure maximum purity and yield of maleic anhydride, the condenser is preferably so designed that the temperature of the walls or cooling surfaces is not greatly below the minimum temperature desired, for example about 60°. Instead of employing a condenser which involves cooling of the maleic anhydride vapors by contact thereof with the cooling surfaces of the said condenser, a direct method of condensation may be employed. Such a direct condensation may employ the cooling effect of contact with a cooler inert liquid or of the latent heat of vaporization of a volatile inert liquid or a combination of both for reducing the sensible heat of the vapor mixture and effecting the condensation of the maleic anhydride. For normal operation at low absolute pressure it will be appreciated that the introduction of substantial additional quantities of vapor to the system may be undesirable as it makes maintenance of vacuum more difficult. The use of a direct contact cooling liquid should be employed only where contact of the maleic anhydride vapors with such liquid is not objectionable.

After the controlled cooling of the vapor mixture to remove maleic anhydride therefrom while retaining water in the vapor form, the residual vapor mixture may be further cooled in any suitable manner to condense it to an aqueous liquid condensate comprising maleic acid, and from which the maleic acid may be recovered if desired. Under conditions of operation described above, the amount of maleic acid which is present in the aqueous condensate recovered in this manner is relatively small compared with the amount of maleic anhydride recovered in the first condensation step.

The specific pressure and/or temperature employed within the above range is dependent upon whether quality or yield of maleic anhydride is the main consideration. At a given pressure within the above range, the use of temperatures in the neighborhood of the upper end of the above range results in a maleic anhydride condensate with a lower content of maleic acid; whereas the use of temperatures in the neighborhood of the lower end of the above range results in a higher yield of maleic anhydride condensate but also in a higher content of maleic acid in the condensate. Conversely, for the recovery of maleic anhydride with a minimum content of maleic acid at a given temperature within the above range, pressures in the neighborhood of the lower end of the above pressure range are preferably employed; whereas, if yield of condensed maleic anhydride is of the greater importance, pressures in the neighborhood of the upper end of the above pressure range are preferably employed. If gas leakage into the system is noticeable, due allowance therefor may be made by use of a pressure in the higher end of the above range. In general, pressures between 100 mm. and 150 mm., and a temperature of about 70°, will produce a high yield of maleic anhydride of satisfactory quality.

The maleic anhydride recovered in the first condensation is a relatively pure product but may be further purified, if desired; as for example, by distillation and rectification.

If it is desired to prepare purified maleic acid, the maleic anhydride produced in accordance with the present invention may be readily converted thereto by treatment with pure water. Thus, while the process of the invention is primarily concerned with the manufacture of maleic anhydride, it also offers an efficient method of purifying maleic acid.

For a fuller understanding of the nature and objects of the invention, reference should be had to the following detailed description taken in connection with the accompanying drawing in which the single figure is a diagrammatic view, partly in section, of one form of apparatus suitable for carrying out the process of the present invention.

Referring to the drawing, I is a still which may be of any suitable design adapted to receive a charge of maleic acid, shown as a flask having a round body portion 2. The flask is disposed in an oil bath 3 contained in vessel 4 which may be heated in any desired manner. Extending at an angle from the body portion is a tubular portion 5 having a port 6 through which a charge of maleic acid may be introduced. As shown, the port is closed to the atmosphere by means of a cork 7. Vertically disposed from the body portion is a neck 8 for conducting the vapors of maleic anhydride from the still I. The neck 8 is supplied with a port 9 which is preferably closed with a cork 10 in which is disposed a thermometer 11. The thermometer 11 extends below an opening 12 in the side of the neck 8 leading to a conduit 13 for carrying the vapors of maleic anhydride and water to a spiral condenser 14 for condensing the maleic anhydride. The condenser 14 leads into the condensate receiver 16 for the maleic anhydride condensate. The condenser 14 and receiver 16 are immersed in a water bath 17 contained in vessel 18 supplied with any suitable means (not shown) for controlling the temperature of the bath. The neck portion 15 is ordinarily closed by the cork 19. A conduit 20 leads from the receiver 16 to a condenser of conventional design designated generally as 21, adapted to condense water vapor under a high vacuum. The condenser 21 has a receiver 22 in which the condensed water is collected. In order to operate the system under reduced pressure, the receiver 22 is connected with a tube 23 leading to a conduit 24 of an evacuating system. The conduit 24 is supplied with a manometer 25 to measure the pressure in the apparatus.

As will be obvious, the apparatus shown provides means for keeping the still 1 and the condenser 14 at any desired temperature. To measure the temperature of the oil bath 3 and the water bath 17, they may be provided with thermometers 26 and 27.

In order that the operation of the process may be more fully understood, it will be illustrated by the following example:

*Example.*—Dry, purified or crude, maleic acid crystals are charged to the still 1. The apparatus, from still 1 to receiver 22, is evacuated to an absolute pressure of about 120–130 mm. The hot water bath 17 is heated to and maintained at about 70°, and the heating of oil bath 3 is begun. As the temperature of oil bath 3 reaches about 150°, the maleic acid in still 1 begins to decompose into a mixture of maleic anhydride vapor and water vapor. The oil bath temperature is gradually increased to a point between 190° and 220° where the decomposition progresses at an optimum rate.

From still 1 the mixture of water and maleic anhydride vapors passes rapidly to condenser 14 which is maintained at a temperature of about 70° by water bath 17. At this temperature and the reduced pressure within the apparatus, substantially all maleic anhydride vapors in the mixture condense to liquid maleic anhydride which collects in receiver 16 while the water vapors, which do not condense at the said temperature and reduced pressure, pass on into cold condenser 21 where they condense, and are collected in receiver 22. Uncondensed maleic anhydride vapors which are retained in the water vapor condense with the water in cold condenser 21, resulting in formation of small amounts of maleic acid.

As the thermal decomposition of maleic acid in still 1 progresses, the charge of maleic acid decreases in volume substantially without liquefaction. The substantially complete removal of the vapors of maleic anhydride and water from the still as they are evolved, in connection with the temperature employed, insures against the formation of an appreciable liquid phase, thereby reducing to a minimum the conversion of maleic acid to fumaric acid. A small non-volatile residue, comprising chiefly fumaric acid, remains in still 1 at the end of the decomposition.

The maleic anhydride collecting in receiver 16 is the equivalent of from about 93% to about 97% of the maleic acid charged as the distilland. It is a clear, colorless or nearly colorless liquid which may hold in solution from 1 to 2 per cent of maleic acid, but is substantially free from fumaric acid and other impurities. If desired, the maleic anhydride from receiver 16 may be further purified as, for example, by distillation and rectification. Thus, the maleic anhydride may be boiled for two or three hours in a vessel fitted with a reflux condenser, and then distilled under atmospheric or reduced pressure to form a clear and colorless distillate consisting substantially of chemically pure maleic anhydride.

By maintaining subatmospheric pressures in the still in which the solid maleic acid is being decomposed and simultaneously maintaining the inner surface of the still at temperatures above the melting point of maleic acid, the decomposition of the acid proceeds at an accelerated rate without the appearance of an appreciable liquid phase. The melting of maleic acid to form a substantial liquid phase is undesirable, for the presence of a liquid phase in the still accelerates the conversion of maleic acid to fumaric acid. To avoid danger of local overheating of the maleic acid at the surface of the mass in contact with the hot inner wall of the still, and to produce and maintain the proper conditions for the distillation of solid maleic acid at these temperatures, an indirect heating means is preferably employed. By supplying heat in this manner to a still containing a mass of solid maleic acid, the exterior surfaces of the solid mass in contact with the inner walls of the still are subjected to substantially uniform temperature conditions. The employment of an oil bath or steam jacket, or other means for surrounding the still containing solid maleic acid with a hot fluid, has been found to offer an effective and desirable means of uniformly supplying heat to the maleic acid, and maintaining the desirable uniform temperature conditions in the still.

For the purpose of illustration, the invention has been described in connection with the recovery of maleic anhydride from the vapor mixture of maleic anhydride vapor and water vapor resulting from the thermal decomposition of solid maleic acid. The invention is not limited thereto, however. It may be applied to the recovery of maleic anhydride from mixtures containing vapors of maleic anhydride and water vapor in proportions higher or lower than the substantially equimolecular proportions produced, for example, by the decomposition of solid maleic acid in its crude or refined forms; as for example, vapor mixtures resulting from the thermal decomposition of aqueous solutions of crude or purified maleic acid or from the thermal decomposition of mixtures containing maleic acid and maleic anhydride, and vapor mixtures resulting from processes other than thermal decomposition of maleic acid. In general, the amount of water in the vapor mixture should not exceed about 5 mols per mol of maleic anhydride present in the vapor mixture, which is about the proportion of water (combined and free) to maleic anhydride present in a 60 per cent aqueous maleic acid solution. Preferably, the amount of water vapor should not exceed substantially one mol per mol of maleic anhydride vapor.

Since, in carrying out the above process, changes may be made without departing from the scope of the invention, it is intended that all matter in the above description shall be interpreted as illustrative and not in a limiting sense, except as limited by the appended patent claims.

I claim:

1. A process of recovering maleic anhydride from a mixture containing maleic anhydride vapor and water vapor which comprises flowing a mixture of maleic anhydride vapor and water vapor in which the molar ratio of water vapor to maleic anhydride vapor is at least equal to 1:1 but not greater than 5:1, in a continual stream, subjecting said mixture to a temperature within the range substantially 60° C. to substantially 80° C. and a correlated pressure within the range 70 mm. to 250 mm. so as to condense maleic anhydride without substantial condensation of water, continually removing maleic anhydride condensate from the stream at a temperature above 60° C., and separately collecting the removed maleic anhydride condensate.

2. A process of recovering maleic anhydride from a mixture containing maleic anhydride vapor and water vapor which comprises flowing a mixture of maleic anhydride vapor and water vapor, in which the molar ratio of water vapor to maleic anhydride vapor is at least equal to 1:1 but not greater than 5:1, in a continual stream, subjecting said mixture to a temperature of substantially 70° C. and a correlated pressure within the range 100 mm. to 250 mm. so as to condense maleic anhydride without substantial condensation of water, continually removing maleic anhydride condensate from the stream at a temperature within the range substantially 60° C. to substantially 80° C., and separately collecting the removed maleic anhydride condensate.

3. A process of recovering maleic anhydride from a flowing mixture of maleic anhydride vapor and water vapor in which the molar ratio of water vapor to maleic anhydride vapor is at least equal to 1:1 but not greater than 5:1, comprising adjusting the temperature and pressure of the flowing vapor mixture to correlated values within the ranges substantially 60° C. to substantially 80° C. and substantially 100 mm. to substantially 150 mm., whereby maleic anhydride is condensed without substantial condensation of water, removing the maleic anhydride condensate from the flowing mixture while the mixture is at a temperature above 60° C., and separately collecting the removed maleic anhydride condensate.

4. A process of recovering maleic anhydride from a flowing mixture of maleic anhydride vapor and water vapor which is of substantially constant composition and in which the molar ratio of water vapor to maleic anhydride vapor is at least equal to 1:1 but not greater than 5:1, comprising adjusting the temperature and pressure of the flowing vapor mixture to correlated values within the ranges substantially 60° C. to substantially 75° C. and 100 mm. to 250 mm., whereby maleic anhydride is condensed without substantial condensation of water, removing the maleic anhydride condensate from the flowing mixture while the mixture is at a temperature within the range substantially 60° C. to substantially 80° C., and immediately collecting separately the removed maleic anhydride condensate.

5. A process of recovering maleic anhydride from a flowing mixture of maleic anhydride and water vapors in which the molar ratio of water vapor to maleic anhydride vapor is substantially 1:1 and which has resulted from the thermal decomposition of maleic acid, comprising cooling the flowing vapor mixture to a temperature between 60° C. and 80° C. while maintaining a correlated pressure between 100 mm. and 150 mm., whereby maleic anhydride is condensed without substantial condensation of water, removing the maleic anhydride condensate from the flowing mixture while the flowing mixture is at a temperature within the range substantially 60° C. to substantially 80° C., and immediately collecting separately the removed maleic anhydride condensate.

6. A process for the preparation of maleic anhydride which comprises heating maleic acid to produce a vapor mixture containing maleic anhydride vapor and water vapor, withdrawing the vapor mixture in a continual stream in which the molar ratio of water vapor to maleic anhydride vapor is at least equal to 1:1 but not greater than 5:1, cooling the stream of vapor mixture to a temperature between 60° C. and 80° C. while maintaining a correlated pressure between 70 mm. and 250 mm., whereby maleic anhydride is condensed without substantial condenstaion of water, removing the maleic anhydride condensate from the stream of vapor mixture while the mixture is at a temperature above 60° C., and immediately collecting separately the removed maleic anhydride condensate.

7. A process for the preparation of maleic anhydride which comprises heating maleic acid to produce a vapor mixture containing maleic anhydride vapor and water vapor in substantially equimolar quantities, withdrawing the vapor mixture in a continuous stream which is of substantially constant composition, cooling the stream of vapor mixture to a temperature between 60° C. and 75° C. while maintaining a correlated pressure between 100 mm. and 150 mm., whereby maleic anhydride is condensed without substantial condensation of water, removing the maleic anhydride condensate from the stream of vapor mixture while the mixture is at a temperature above 60° C., and immediately collecting separately the removed maleic anhydride condensate.

8. A process for the preparation of maleic anhydride which comprises heating maleic acid to produce a vapor mixture containing maleic anhydride vapor and water vapor in substantially equimolar quantities, withdrawing the vapor mixture in a continuous stream which is of substantially constant composition, cooling the stream of vapor mixture to a temperature of substantially 70° C. while maintaining a correlated pressure between 100 mm. and 150 mm., whereby maleic anhydride is condensed without substantial condensation of water, removing the maleic anhydride condensate from the stream of vapor mixture while the mixture is at a temperature within the range substantially 60° C. to substantially 80° C., and immediately collecting separately the removed maleic anhydride condensate.

ELTON B. PUNNETT.